United States Patent [19]

Hasegawa et al.

[11] Patent Number: 4,726,340

[45] Date of Patent: Feb. 23, 1988

[54] INTAKE SYSTEM FOR MULTI-CYLINDER ENGINE

[75] Inventors: Masatoshi Hasegawa, Kakegawa; Keiichi Sugiyama, Shizuoka, both of Japan

[73] Assignee: Yamaha Hatsudoki Kabushiki Kaisha, Iwata, Japan

[21] Appl. No.: 845,573

[22] Filed: Mar. 28, 1986

[30] Foreign Application Priority Data

Mar. 30, 1985 [JP] Japan .................................. 60-67165

[51] Int. Cl.$^4$ ............................................. F02B 15/00
[52] U.S. Cl. ............................... 123/432; 123/188 M; 123/52 M
[58] Field of Search ................... 123/432, 308, 188 M, 123/52 M

[56] References Cited

U.S. PATENT DOCUMENTS 4,550,699 11/1985 Okumura et al. ............... 123/188 M

FOREIGN PATENT DOCUMENTS

| 31724 | 8/1972 | Japan | 123/432 |
| 110765 | 9/1982 | Japan | 123/432 |
| 48712 | 3/1983 | Japan | 123/432 |
| 135354 | 8/1983 | Japan | 123/432 |
| 43923 | 3/1984 | Japan | 123/432 |
| 213922 | 12/1984 | Japan | 123/432 |
| 150423 | 8/1985 | Japan | 123/308 |
| 147536 | 8/1985 | Japan | 123/308 |

Primary Examiner—E. Rollins Cross
Attorney, Agent, or Firm—Ernest A. Beutler

[57] ABSTRACT

Several embodiments of induction systems for internal combustion engines wherein each chamber of the engine is served by a relatively long low speed induction passage and a relatively short high speed induction passage. The arrangements of the passages is such that the change in length is achieved quite simply by positioning a throttle valve at the upstream end of the short induction passage and having both passages communicate with an air inlet device. Several embodiments of throttle valve arrangements are also disclosed wherein a single throttle valve can control the flow through two adjacent induction passages.

14 Claims, 7 Drawing Figures

INTAKE SYSTEM FOR MULTI-CYLINDER ENGINE

BACKGROUND OF THE INVENTION

This invention relates to an intake system for a multi-cylinder engine and more particularly to an improved induction system for an engine chamber and a throttle valve arrangement therefor.

Recently, it has been realized that the power and torque curve of an internal combustion engine can be improved throughout its entire running speed by providing a dual induction system for each chamber of the engine. The dual induction system uses a relatively long tuned low speed induction passage for improving low speed performance. In addition, a relatively short tuned high speed induction passage is provided for increasing high speed performance. In this way, the engine can be tuned for a plurality of running speeds and a throttle valve arrangement is incorporated so that the long passage supplies the low speed requirements while the short passage comes into play to assist in the high speed running. Although this type of arrangement has been proven to be highly advantageous, the induction systems of the type heretofore proposed have embodied several separate tuned passage for each cylinder and thus have given rise to somewhat complicated manifolding.

It is, therefore, a principal object of this invention to provide an improved and simplified induction system for an engine chamber that can be tuned for different running conditions and which will nevertheless be relatively simple.

It is another object of this invention to provide an improved induction passage for multi-cylinder engines wherein the tuning for different running conditions can be simplified.

It is yet a further object of this invention to provide an improved tuning system for the induction system of an internal combustion engine.

It is a still further object of this invention to provide an induction for a chamber of an engine wherein two different passages serve each chamber and wherein they can be conveniently yet effectively tuned for different running conditions.

In conjunction with a variety of applications, there are times when it is desired to provide a throttle control for two adjacent induction passages. Normally, this is done by providing a separate throttle valve in each induction passage. When such an arrangement is employed, it is necessary to interconnect the throttle valves so that they can be operated simultaneously and also to provide a linkage system for interconnecting the throttle valves so that they will all be operated in unison. Of course, such an arrangement gives rise to complication and added expense.

It is, therefore, a still further object of this invention to provide an improved throttling arrangement for a pair of adjacent induction passages.

It is a still further object of this invention to provide a throttling arrangement for two adjacent induction passages wherein a single throttle valve controls the flow through both passages.

SUMMARY OF THE INVENTION

A first feature of this invention is adapted to be embodied in an induction system for an internal combustion engine comprising a variable volume chamber and first and second intake passages that serve the chamber. An intake device is incorporated that includes a plenum chamber for serving the first and second intake passages. A throttle valve is positioned in the second intake passage for controlling the flow through it. The throttle valve is positioned contiguous to the point where the second intake passage enters the plenum chamber for forming a relatively short effective length for the second intake passage. The first intake passage opens into the plenum chamber at a substantially greater distance into the plenum chamber for forming a relatively long effective length for the first intake passage.

Another feature of the invention is adapted to be embodied in an induction system for an internal combustion engine having a pair of adjacent variable volume chambers. A pair of first relatively long intake passages each serve a respective one of the chambers. A pair of second relatively short intake passage each serve a respective one of the chambers also. The second pair of intake passages lie between the first pair of intake passages and throttle valve means control the flow through one of the pair of intake passages.

Yet another feature of the invention is adapted to be embodied in a throttle valve for a pair of passages that together define a generally cylindrical shape and which are divided by a generally diametrically extending dividing wall. The dividing wall terminates short of the ends of the passages and a single butterfly type throttle valve is positioned in the cylindrical shape area where the wall is not present so as to control the flow through both of the passages.

DETAILED DESCRIPTION OF THE PREFERRED EMBODIMENTS

Figure 1:
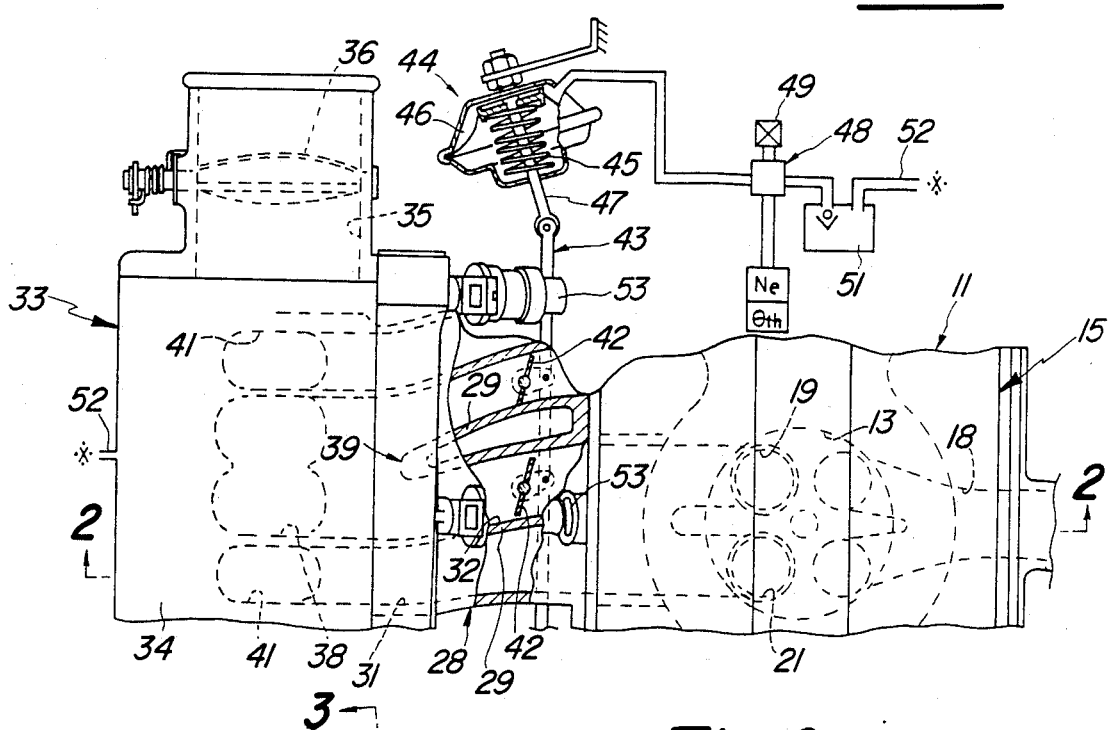
FIG. 1 is a partial top plan view of a portion of an internal combustion engine having an induction system constructed in accordance with an embodiment of the invention.
Figure 2:
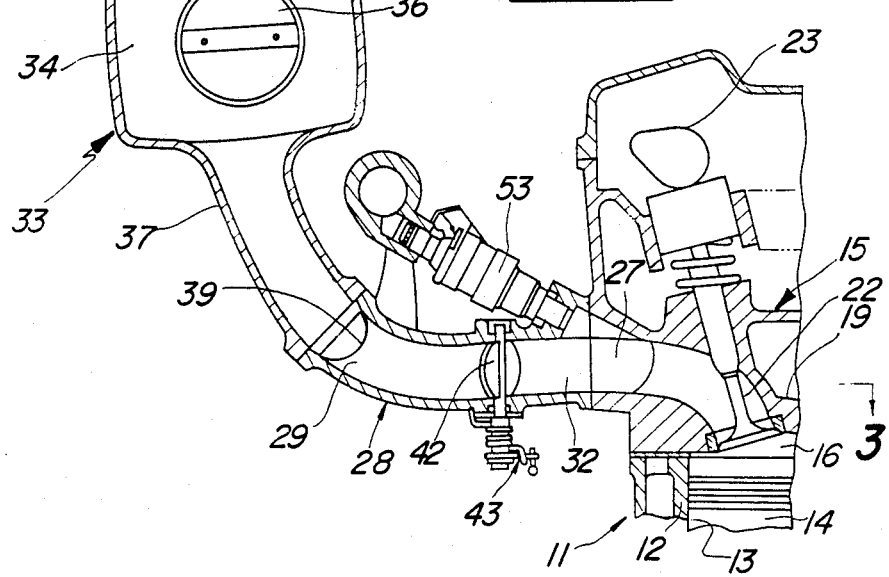
FIG. 2 is a cross-sectional view taken along the line 2—2 of FIG. 1.
Figure 3:
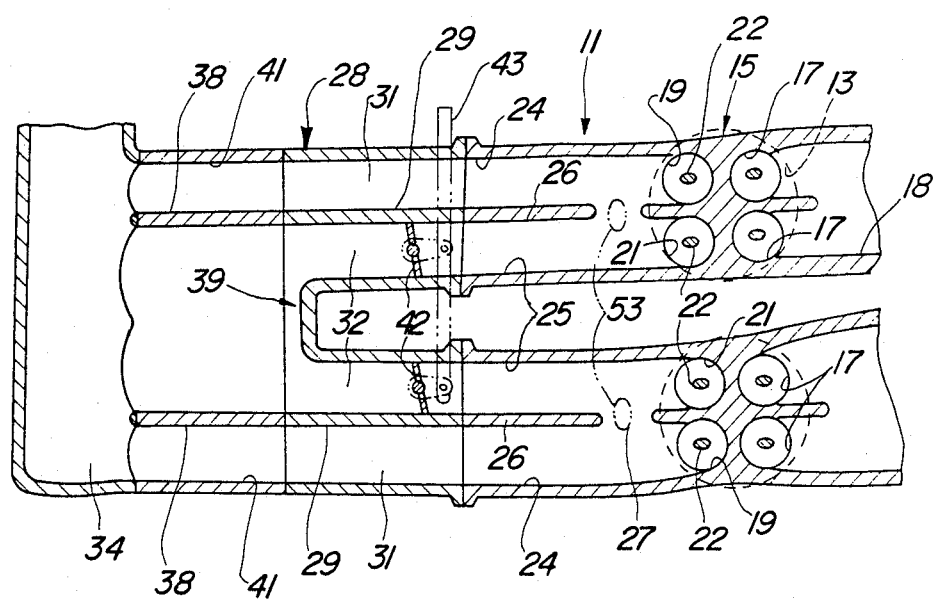
FIG. 3 is a cross-sectional view taken along the line 3—3 of FIG. 1.

Referring first to the embodiment of FIGS. 1 through 3, an internal combustion engine constructed in accordance with this embodiment is identified generally by the reference numeral 11. The engine 11 includes a cylinder block 12 in which cylinder bores 13 are formed. Although the configuration of the cylinder block 12 and cylinder bores 13 is not a critical feature of the invention, the invention has particularly utility wherein at least two cylinder bores 13 are positioned adjacent to each other. Such an arrangement can, of course, be present in either an inline, a V type or an opposed engine, as those skilled in this art will well understand. Pistons 14 are supported for reciprocation within the cylinder bores 13 and are connected by means of connecting rods to a crankshaft in a known manner. Since this portion of the engine forms no part of the invention, it will not be described in detail.

A cylinder head assembly, indicated generally by the reference numeral 15, is affixed to the cylinder block 12 in a known manner and is provided with a plurality of chambers 16 that cooperate with the pistons 14 and cylinder bores 13 to form the variable volume chambers of the engine. In the illustrated embodiment, the engine 11 operates on the four-stroke cycle and hence the chambers 16 may be considered to be the engine combustion chambers.

A pair of exhaust ports 17 are formed adjacent to each other and on one side of the cylinder head 15 for each combustion chamber 16. The ports 17 merge into a siamesed exhaust passage 18 that cooperates with an associated exhaust manifold and exhaust system (not shown) for delivering the exhaust gases to the atmosphere.

The opposite side of the cylinder head 15 is formed with a pair of inlet port 19 and 21. The inlet ports 19 and 21 of adjacent cylinders are staggered so that the intake ports 21 will be positioned adjacent to each other while the intake ports 19 will be spaced from each other. The reason for this will become apparent as this description proceeds. Intake valves 22 are slidably supported within the cylinder head assembly 15 and cooperate with each of the intake ports 19 and 21 for controlling the flow through the intake ports 19 and 21. The intake 22 are all operated by means of a camshaft 23 that is supported in the cylinder head assembly 15 and which is driven from the crankshaft of the engine in any known manner.

A first intake passage 24 is formed in the cylinder head assembly 15 for each combustion chamber 16. The intake passages 24 extend through one side of the cylinder head 15 and terminate at the intake ports 19. In a like manner, a second intake passage 25 is formed in the cylinder head assembly 15 and extends through the opening in the one side of the cylinder head to the intake ports 21. As a result, the intake passages 25 are adjacent to each other and between the intake passages 24 of adjacent cylinders. The intake passages 24 and 25 of each cylinder are separated by means of a dividing wall 26. The dividing wall 26 is provided with an interrupted area 27 adjacent the ports 19 and 21 so as to permit communication therebetween, for a reason to be described.

A combined intake manifold, valve block assembly, indicated generally by the reference numeral 28, is affixed to the intake side of the cylinder head 15 in an appropriate manner. The intake manifold 28 is provided with a wall 29 which mates with each of the cylinder head walls 26 and thus forms an extension of it to divide the intake manifold into a first passage 31 that registers with the cylinder head intake passage 24 and a second passage 32 which registers with the cylinder head intake passage 25. Again, the passages 32 of the intake manifold 28 are adjacent to each other and lie between the intake passages 31 associated with adjacent cylinders.

An air inlet device, indicated generally by the reference numeral 33, is provided for delivering air to the combustion chambers through the respective passages 31, 32, 24 and 25. The air inlet device 33 is comprised of a housing that defines a plenum chamber 34 of fairly substantial volume. An inlet opening 35 is provided at one end of the plenum chamber 34 and is open in a suitable manner to atmospheric air. A manually operated throttle valve 36 is positioned in the inlet opening 35 for controlling the total air flow to the engine 11 and specifically to the chambers 16 for controlling the engine speed.

The inlet device 34 also includes a runner section 37 that extends from and forms a part of the plenum chamber 34 and which terminates at a flange that is affixed to the intake manifold 29 so as to communicate with it. The runner section 37 is provided with a plurality of walls 38 which mate with the manifold walls 39 and thus form a further extension of the manifold passages 29 and the cylinder head intake passages 24. On the other hand, the manifold passages 32 are terminated short of the runner by means of a wall 39 so that they will communicate at a much earlier or shorter distance into the plenum chamber 34 than the aforedescribed passages. Hence, the passages consisting of the cylinder head portion 24, manifold portion 31 and the portion of the air inlet device defined by the wall 38 are relatively long whereas the passages formed by the cylinder head passages 25 and manifold passages 32 are relatively short. The length of each of these passages is tuned so as to satisfy respective, low speed and high speed running conditions of the engine 11, as will become apparent. The intake device passages that cooperate with the manifold passages 29 are identified by the reference numerals 41 in the drawings.

There are provided throttle valves 42 in the manifold intake passages 32 closely adjacent the wall 39. Throttle valves 42 are of the butterfly type and are rotatably supported on vertically extending throttle valve shafts. Levers affixed to all of these throttle valve shafts are connected to a link 43 which is, in turn, connected to the diaphragm of a vacuum actuator 44. This diaphragm divides the vacuum actuator 44 into an atmospheric chamber 45 and a control pressure chamber 46. The atmospheric chamber 45 is exposed to atmospheric pressure by an opening that clears a link 47 that is connected to the link 43 and to the diaphragm.

A spring within the atmospheric chamber 45 and the atmospheric pressure normally urges the diaphragm to a position wherein the throttle valves 42 are closed when the control pressure chamber 46 is exposed to a negative pressure such as manifold pressure or the pressure in the plenum chamber 34.

A control valve, indicated generally by the reference numeral 48, is provided for controlling the pressure in the control pressure chamber 46. The control valve 48 either selectively communicates the chamber 46 with an atmospheric inlet 49 or with an accumulator chamber 51 that is exposed via a conduit 52 to the pressure in the plenum chamber 34 so as to maintain a sub-atmospheric pressure in the accumulator chamber 51. The valve 48 is operated by a suitable controller that is responsive to both engine speed (Ne) and position of the throttle valve 36 $\theta$ th. Alternatively, other control parameters may be employed for opening the throttle valves 42.

A fuel injection nozzle 53 is supported in the intake manifold 28 for each chamber 16. The injection nozzles 53 are disposed so that they will discharge into the area 27 where the passages 24 and 25 communicate with each other. In this way, one injection nozzle 53 serves both passages 24 and 25 for each combustion chamber 16.

The embodiment thus far illustrated operates as follows. When the engine is running at low speed or at idle and the throttle valve 36 is only partially opened, the controller of the valve 48 will expose the control chamber 46 to sub-atmospheric pressure and the diaphragm will be urged to the position shown in FIGS. 1 through 3 so that the control valves 42 will be closed. Under this condition, the intake charge for the combustion chambers 16 flows primarily through the passages 41, 29 and 26 and intake ports 19. Thus, a relatively high velocity flow will occur and a relatively long induction passage is provided so as to achieve good tuning for this engine running condition. It should be noted that a small amount of flow will pass through the connecting passageways 27 into the intake ports.

As the throttle valve 36 is opened and the engine speed and load increases, eventually the throttle valves 42 will be opened through actuation of the valve 48 to expose the control chamber 46 to atmospheric pressure. Under this condition, the pressure of the spring will be overcome and the throttle valves 42 will be opened. A torsional spring operating on the shaft of each throttle valve can be employed so as to assist in this opening operation. When this occurs, the combustion chamber 16 will be additionally served by the relatively short intake passages consisting of the portions 32 and 25 and a lower flow resistance and better tuning for high speed performance will result. Thus, it should be apparent that the induction system can be simply and conveniently tuned for all running conditions so as to improve its performance throughout all running conditions in a relatively simple manner.

In the embodiment thus far described, there is provided a single throttle valve for the one induction passage serving each combustion chamber. This results in the necessity of providing a throttle valve for each chamber in addition to the main throttle valve 36. FIGS. 4 and 5 and 6 and 7 show two embodiments of the invention wherein a single throttle valve can control the flow through the induction passages serving two chambers. This can be conveniently done since the induction passages comprised of the portions 32 and 25 are positioned adjacent to each other.

Figure 4:
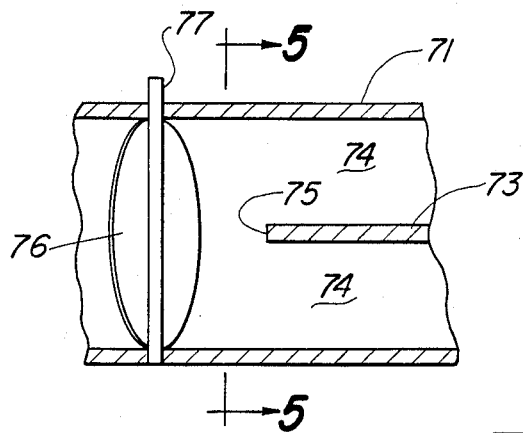
FIG. 4 is an enlarged cross-sectional view looking through a pair of adjacent induction passages containing a single throttle valve for controlling the flow through both induction passages in accordance with another embodiment of the invention.
Figure 5:
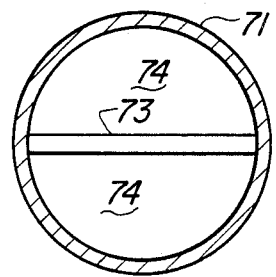
FIG. 5 is a cross-sectional view taken along the line 5—5 of FIG. 4.

Referring first to the embodiment of FIGS. 4 and 5, the intake manifold is formed with a runner 71 that has a cylindrical cross-sectional configuration 72. This is divided into two halves by a generally diametrically extending wall 73. This forms passages 74 for each intake port 21 of the adjacent cylinders. The wall 43 terminates at a point 75 and a throttle valve 76 is rotatably journaled in this point on a throttle valve shaft 77 that extends perpendicularly to the wall 73 and across a diameter of the passage 72. The throttle valve 76 may be controlled in the same manner as the previously described embodiment. Therefore, it should be readily apparent that this embodiment employs a single throttle valve for controlling the flow through two intake passages.

Figure 6:
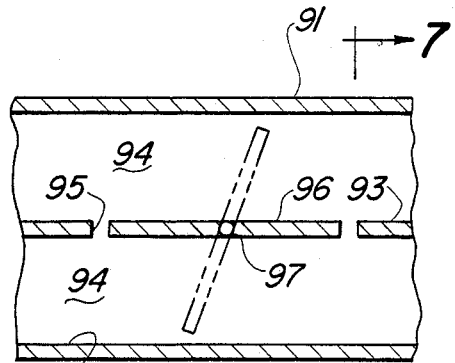
FIG. 6 is a view, in part similar to FIG. 4, showing another embodiment of the invention.
Figure 7:
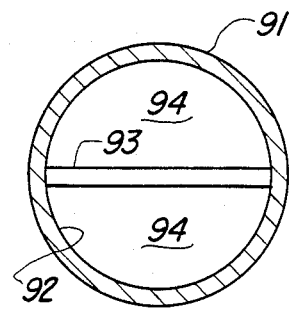
FIG. 7 is a cross-sectional view taken along the line 7—7 of FIG. 6.

Another manner in which this may be done is illustrated in the embodiments of FIGS. 6 and 7 where a manifold runner is indicated generally by the reference numeral 91. The runner 91 has a cylindrical inner configuration 92 that is divided into two portions by a generally diametrically extending wall 93. The wall 93 forms portions 94 which cooperate with the intake ports 21 of adjacent cylinders. The wall 93 is provided with an interruption 95 and a throttle valve 96 is supported on a throttle valve shaft 97 in this interrupted area. In this embodiment, the throttle valve shaft 97 lies on a diametral plane that is coincident with the wall 95. Hence, the throttle valve has one half portion that cooperates with one passageway and another half portion that cooperates with another passageway 94 so as to control the flow through them as should be readily apparent from FIG. 6.

From the foregoing description, it should be readily apparent that a number of embodiments of the invention have been illustrated and described wherein convenient dual stage tuning may be provided for each combustion chamber of the engine. Because of the provision of adjacent cylinders and the close placing of the short, high speed intake passages, a simple throttle valve arrangement may be employed for controlling the flow through two adjacent passages by the use of a single throttle valve.

It is to be understood that the foregoing is a description of a preferred embodiment of the invention and that various changes and modifications may be made without departing from the spirit and scope of the invention, as defined by the appended claims.

We claim:

1. An induction system for an internal combustion engine comprising a cylinder head defining at least in part a pair of adjacent variable volume chambers, a first pair of intake passages each serving a respective one of said chambers, a second pair of intake passages each serving a respective one of said chambers, an intake device defining a plenum chamber for serving said pairs first and second intake passages, and throttle valve means in said second intake passages for controlling the flow therethrough, said second intake passages being adjacent each other and separated by a wall, said throttle valve means being positioned contiguous to the point where said second intake passages interconnects with said plenum chamber for forming a relatively short effective length for said second intake passage, said wall terminating on the upstream side of said second intake passages from said throttle valve means for communicating said second intake passages with each other and with said plenum chamber immediately upstream of said throttle valve means said first intake passages being spaced from each other and having portions opening into said plenum chamber at a substantially greater distance into said plenum chamber for forming a relatively long effective length for said first intake passage.

2. An induction system as set forth in claim 1 further including a manually operated throttle valve for controlling the flow of air into the plenum chamber.

3. An induction system as set forth in claim 1 wherein the plenum chamber is formed by an air inlet device having a pair of runners each serving first and second intake passages, said pairs of first and said second intake passages being formed in part in in a valve body interposed between the intake device and the engine.

4. An induction system as set forth in claim 1 wherein the first and second intake passages communicate with each other downstream of the plenum chamber and upstream of the variable volume chamber.

5. An induction system as set forth in claim 4 wherein the first and second intake passages each serve the respective variable volume chamber through respective first and second intake ports and further including pairs of first and second intake valves for controlling the flow through said first and said second intake ports, respectively.

6. An induction system as set forth in claim 5 further including a pair of fuel injection nozzles for spraying fuel into the respectives of the first and second intake passages where they communicate with each other.

7. An induction system for an internal combustion engine having a pair of adjacent variable volume chambers, a first pair of relatively long intake passages each serving a respective one of said chambers, a second pair of relatively short intake passages each serving a respective one of said chambers, said second pair of intake passages being positioned between the intake passages of said first pair, and said second pair of intake passages being formed by a generally cylindrical runner divided into said first and second intake passages by a diametrically extending wall having an interrupted portion and a single butterfly type throttle valve supported in said interrupted portion for controlling the flow through only both of said second pair of intake passages.

8. An induction system as set forth in claim 7 wherein the butterfly type throttle valve is rotatably supported on a throttle valve shaft that extends perpendicularly to the wall.

9. An induction system as set forth in claim 7 wherein the butterfly type throttle valve is rotatably supported on a throttle valve shaft that extends in the same plane as the wall.

10. An induction system as set forth in claim 7 further including an inlet device comprising a plenum chamber for supplying an air charge to all of the intake passages.

11. A induction system as set forth in claim 10 wherein the plenum chamber has a plurality of passages aligned with the respective pairs of intake passages.

12. An induction system as set forth in claim 11 further including manually operated throttle valve means for controlling the flow of air into the plenum chamber.

13. An induction system as set forth in claim 12 wherein each chamber has first and second intake ports served by the intake passages of the pairs and further including intake valves for controlling the flow through said intake ports.

14. An induction system as set forth in claim 3 wherein the first and second intake passages serving each of the chambers are formed in part of the cylinder head, the valve body and the intake device runner, the wall separating the second intake passages from each other terminating in the valve body.

* * * * *

UNITED STATES PATENT AND TRADEMARK OFFICE
CERTIFICATE OF CORRECTION

PATENT NO. : 4,726,340
DATED : February 23, 1988
INVENTOR(S) : Hasegawa, et al

It is certified that error appears in the above-identified patent and that said Letters Patent is hereby corrected as shown below:

Column 1, line 26, "passage" should be --passages--.

Column 2, line 18, "passage" should be --passages--.

Column 2, line 64, "particularly" should be --particular--.

Column 3, line 23, "port" should be --ports--.

Column 3, line 31, after "intake" (second occurrence in patent) insert --valves--.

Column 4, line 16, "eariler" should be --earlier--.

Column 5, line 12, after "ports" insert --21--.

Column 6, line 27, Claim 1, after "pairs" insert --of--.

Column 6, line 52, Claim 3, delete "in" (third occurrence in patent).

Column 8, line 6, Claim 11, "A" should be --An--.

Column 8, line 19, Claim 14, "of" (second occurrence in patent) should be --in--.

Signed and Sealed this

Twenty-seventh Day of February, 1990

Attest:

JEFFREY M. SAMUELS

*Attesting Officer*    *Acting Commissioner of Patents and Trademarks*